United States Patent
Maggetti

(10) Patent No.: US 6,749,069 B2
(45) Date of Patent: Jun. 15, 2004

(54) EQUIPMENT FOR FILTERING A LIQUID

(76) Inventor: Luciano Maggetti, Via Migiome 4, 6616 Losone (CH)

( * ) Notice: Subject to any disclaimer, the term of this patent is extended or adjusted under 35 U.S.C. 154(b) by 0 days.

(21) Appl. No.: 10/398,404

(22) PCT Filed: Sep. 17, 2001

(86) PCT No.: PCT/IB01/01685
§ 371 (c)(1),
(2), (4) Date: Apr. 7, 2003

(87) PCT Pub. No.: WO02/34355
PCT Pub. Date: May 2, 2002

(65) Prior Publication Data
US 2004/0011728 A1 Jan. 22, 2004

(30) Foreign Application Priority Data
Oct. 27, 2000 (CH) .............................................. 2100/00

(51) Int. Cl.⁷ ......................... B01D 29/66; B01D 29/68
(52) U.S. Cl. ...................... 210/409; 210/413; 210/414; 210/416.1
(58) Field of Search .................. 210/407, 409, 210/411, 413, 414, 416.1, 416.5

(56) References Cited
U.S. PATENT DOCUMENTS 4,412,920 A * 11/1983 Bolton et al. ................ 210/409
5,074,999 A * 12/1991 Drori ........................... 210/143
5,804,072 A * 9/1998 Yang ............................ 210/411

FOREIGN PATENT DOCUMENTS

| DE | 41 36 945 | 5/1993 |
| DE | 197 02 043 | 7/1998 |
| FR | 2 545 377 | 11/1984 |

* cited by examiner

Primary Examiner—Fred G. Prince
(74) Attorney, Agent, or Firm—Young & Thompson

(57) ABSTRACT

A description is given of equipment for filtering liquids, comprising three sections superimposed coaxially and placed above a container with filter walls for collecting the filtered particles. From the top to the bottom, the first section communicates directly with the second, while the second communicates with the third sector, and the latter communicates with the container via two valves. A pump introduces the liquid to be filtered into the first section, inside a filter layer, and another pump projects a quantity of the previously filtered liquid against the filter layer from the inside of the first section. By cyclically operating the valves it is possible to continuously filter the liquid, which flows out in the filtered state from ducts which branch from the first section, even while the particles deposited in the third section are discharged into a container with filter walls which is immersed in a vessel containing the liquid to be filtered.

5 Claims, 2 Drawing Sheets

EQUIPMENT FOR FILTERING A LIQUID

Figure 1:
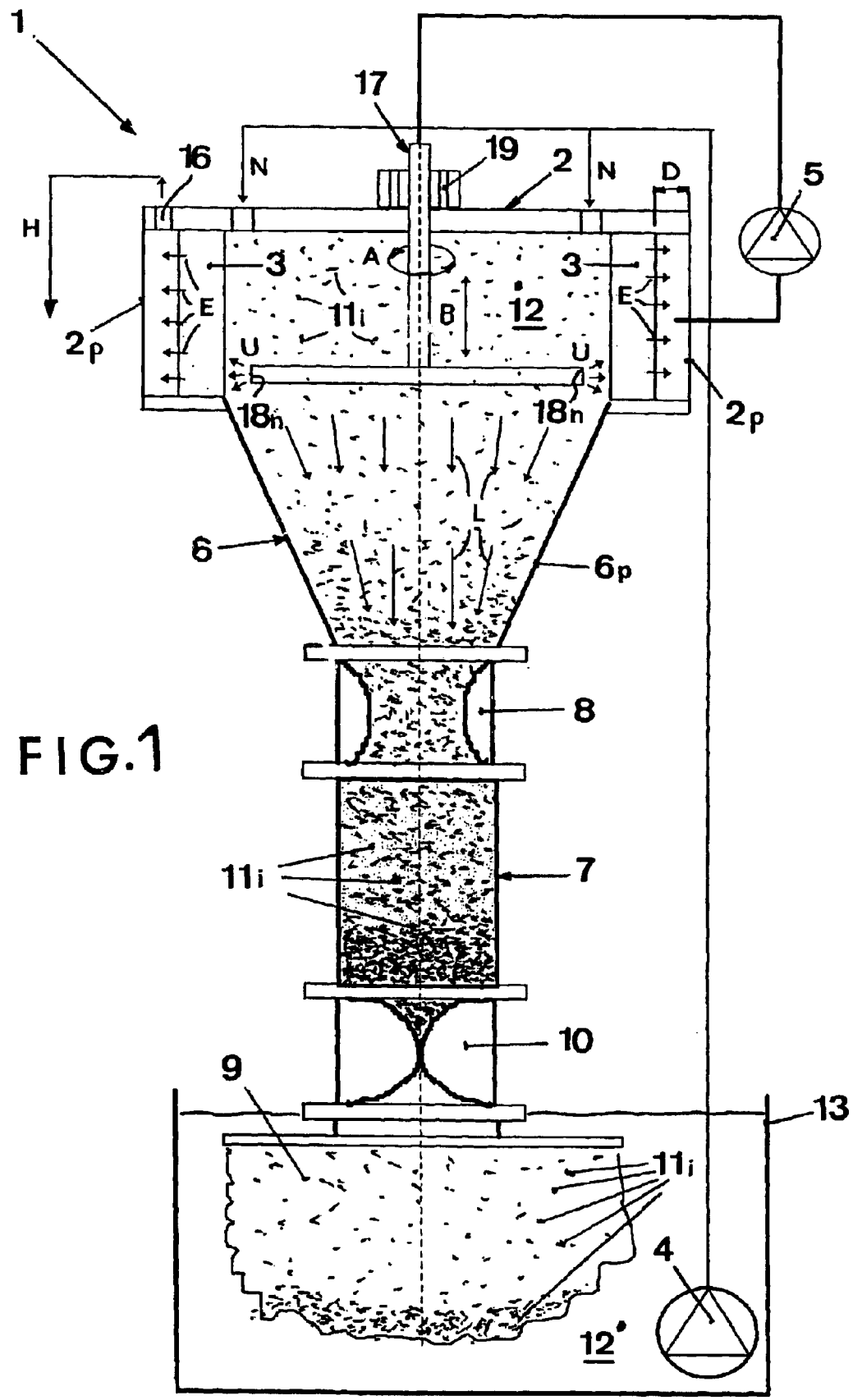

The present invention relates to the technical field of equipment which carries out the filtering and removal of solid particles contained in suspension in a liquid.

Such equipment is used in many industrial applications, including for example that of removing chips and impurities from the lubricating and cooling liquid used in machining operations such as grinding, surfacing, etc.

In currently known equipment, designed and constructed in various ways, all the liquid filtered by the equipment is made to circulate through mechanical filters or cloths and the like, which have to be periodically cleaned or removed with the filtered sludge, and the particles which are concentrated in the filter area also have to be removed periodically.

This requires repeated interruptions of the operating cycle, making it necessary to use two pieces of equipment in parallel, operating alternately, if it is desirable to filter continuously the liquid from a machine tool when it is undesirable, or impossible, to interrupt the operation of the machine tool. The total cost of the complete filter equipment is therefore doubled.

Moreover, since the liquid to be filtered is projected under pressure against the filter surfaces, foreign bodies, sometimes of considerable dimensions and mass, sucked up by the liquid circulation pump, frequently strike the filter surfaces violently and damage them.

The inventor of the present invention has devised equipment which overcomes all the above drawbacks, owing to its particular configuration.

In this equipment, not all of the liquid from which particles in suspension have to be removed passes through a filter layer: some of these particles are permitted to settle under their own weight, so that they converge in a lower section of the equipment.

Additionally, some of the liquid which has already been filtered is used for planned continuous cleaning of the filter layer while the equipment is carrying out its work, and therefore the equipment does not have to be stopped.

The aforementioned particles, when they have formed a mass of predetermined size, are transferred by gravity into an additional underlying section, where they are concentrated and from which they are subsequently discharged into a container with filter walls immersed in the vessel into which the liquid to be filtered is directed.

The passage of the particles from one section to the other, and from there towards the said container with filter walls, is achieved by the cyclic opening and reclosing, with appropriate timing, of valves through which, as is explained more fully below, the sections of the equipment communicate with each other and with the said container with filter walls.

Equipment made according to the present invention can therefore be used continuously, without stops.

The object of the present invention is therefore equipment as described in the precharacterizing clause of the attached claim 1, characterized by what is disclosed in the characterizing clause of the said claim.

Figure 2:
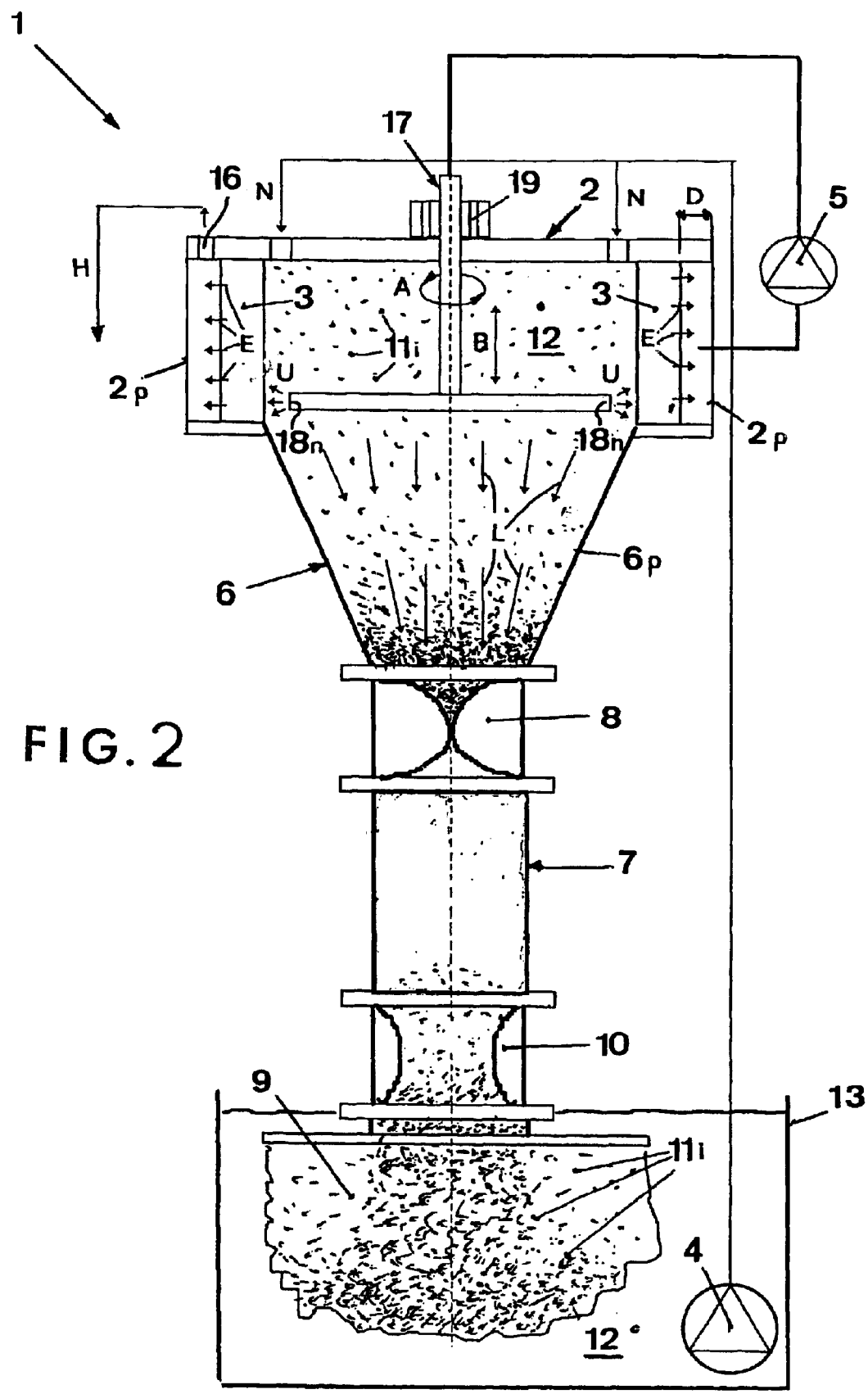

According to the teachings of the aforesaid claim 1, the equipment can be made in numerous different ways, according to the application; a preferred embodiment of the equipment is described below, with reference to the attached drawings, which show:

in FIG. 1, a schematic longitudinal section through the said preferred embodiment of the equipment according to the invention where filtering of a liquid is in progress;

in FIG. 2, the longitudinal section through the equipment of FIG. 1, where the filtered particles which have accumulated in a section of the equipment are being removed while the filtering function continues normally.

With reference to both FIGS. 1 and 2, these show how equipment 1 according to the invention consists of a plurality of sections 2, 6 and 7 superimposed on each other coaxially, with their lowest ends communicating with a container 9 with filter walls immersed in a vessel 13 for the liquid 12 to be filtered.

First pumping means, consisting of a first pump 4 in the drawings, draw up the liquid 12 to be filtered from the said vessel 13 and send it under pressure to a first section 2 of the equipment 1, which is located at a higher level and is surrounded by a filter layer 3, which in turn is surrounded by coaxial walls 2p, located outside, and at a distance D from, the aforesaid filter layer 3.

Second pumping means, consisting of a second pump 5 in the drawings, draw up a quantity of the liquid 12 which is already filtered as a result of having passed (arrows H) through the filter layer 3, and project it under pressure, from the interior of the said first section 2, towards the said filter layer 3 (arrows U), in such a way that the layer is continuously cleaned and its holes are kept free of particles which could block them.

The remainder of the liquid 12 which has already been filtered passes (arrow H) out of the said first sector 2 through one or more ducts 16 formed in the cavity with a thickness D, which is present, as has been stated, between the filter layer 3 and the coaxial walls 2p which surround it.

In order to make the said operation of cleaning the filter layer 3 more efficient and functional, the said second pump 5 projects the said quantity of previously filtered liquid 12 towards the filter layer, through a device, for example a T-arm 17, with one or more horizontal sides 17n, each provided with a nozzle 18n, directed perpendicularly against the said layer 3.

It should be noted that, in order to improve further the result of the said operation of cleaning the filter layer 3, the liquid 12 to be filtered is sent by the said first pump 4 into the first section 2 from above (arrows N), in a parallel way and practically tangentially to the said filter layer 3. This creates additional turbulence, which facilitates the work of removing the particles 11i from the holes of the filter layer 3.

It is also preferable to provide the said T-arm 17 with means of a known type 19 which can make it rotate (arrow A) and/or move vertically (arrow B) with an alternating movement while the said cleaning operation is carried out.

The lower part of the said first section 2 is connected by its walls 2p to the walls 6p of a second section 6, which is coaxial with the first and preferably of truncated conical shape as shown, into which the particles 11i contained in the liquid 12 flow by gravity (arrows L) without having to be retained by the filter layer 3. This is because the operations of cleaning and remixing described above cause the particles 11i contained in the liquid 12 to continue to circulate between the filter layer 3 and the area of the first section 2 lying within it, until the gravitational component pushes them downwards, in other words into the said second section 6, where they accumulate.

A third section 7 is fitted below and coaxially with the said second section 6, and is separated from it by means of a first valve 8, and this third section communicates downwards, through a second valve 10, with a container 9 with filter walls immersed in a vessel 13 into which the liquid 12 to be filtered is introduced.

By suitable operation of the said two valves 8 and 10 while the equipment 1 is in operation, the results of continuity of operation mentioned above, and shown in the figures, are achieved.

FIG. 1 shows the equipment 1 in operation, with both pumps 4 and 5 working, the first of these introducing the liquid 12 to be filtered into the first section 2 while the second projects a quantity of the filtered liquid against the filter layer 3.

The said first valve 8 is open, and the particles 11i, which settle in the second section 6, are deposited and concentrated in the underlying third section 7, which retains them because it is separated below from the said container 9 by the second valve 10, which is closed.

On the other hand, FIG. 2 shows how, while all the members of the equipment 1 continue to operate, the first valve 8 has been closed, thus separating the second sector 6 from the third sector 7 with a hermetic seal, and the second valve 10 has been opened, allowing the concentrated particles 11i to flow down by gravity into the said container 9 with filter walls, which retains them and which can be removed when it contains a predetermined quantity of them.

Clearly, the closing of the first valve 8 and the opening of the second valve 10 are carried out when the third section 7 has been saturated with particles 11i.

After the particles 11i have been removed from the third section 7 which contained them, the operation is repeated in reverse, the first valve 8 being reclosed to bring the equipment into the condition shown in FIG. 1. The operating cycle can therefore recommence from the start, without any need to stop the operation of the equipment 1 at any time.

Any foreign bodies introduced by the first pump 4 into the first section 2 fall rapidly, because of their weight, into the underlying second section 6 and then into the third section 7, without interacting with the filter layer 3, and can subsequently be removed together with the particles 11i when these are discharged into the container 9 which retains them between its filter walls.

The equipment according to the invention can therefore be used to achieve all the objects identified by the inventor.

What is claimed is:

1. Equipment (1) for filtering and removing particles (11i) contained in suspension by a liquid (12), characterized in that it comprises:

a first section (2) surrounded by a filter layer (3);

a second section (6), delimited externally by walls (6p) which are connected below to walls (2p) which surround the said first section (2) and the said filter layer (3), which is spaced at a distance (D) from the filter layer;

a third section (7) placed coaxially with and underneath the said second section (6), with which it communicates via a first valve (8);

a container (9) with filter walls for collecting the sludge formed by the filtered particles (11i), placed under the said third section (7), with which it communicates via a second valve (10);

a vessel (13) for the liquid (12) to be filtered, containing inside it the said container (9) with filter walls;

first pumping means (4) which draw up the liquid (12) to be filtered from the said vessel (13) and introduce it under pressure into the said first section (2);

second pumping means (5) which draw up a quantity of the filtered liquid present between the filter layer (3) and the walls (2p) which surround the said first section (2), and project it against the said filter layer (3) from the inside of the said first section (2); and one or more ducts (16) for the outflow of the remainder of the filtered liquid present between filter layer (3) and the walls (2p) which surround the said first section (2).

2. Equipment according to claim 1, in which the liquid (12) to be filtered is introduced by the said first pumping means (4) into the said first section (2) from the top towards thin bottom, in a parallel way and practically tangentially to the walls of the said filter layer (3).

3. Equipment according to claim 2, in which the said second pumping means (5) project the said quantity of the filtered liquid against the filter layer (3) through a device (17) provided with one or more outlet nozzles mounted on the ends of the same number of arms (18n) perpendicular to the filter layer (3).

4. Equipment according to claim 1, in which the said second pumping means (5) project the said quantity of the filtered liquid against the filter layer (3) through a device (17) provided with one or more outlet nozzles mounted on the ends of the same number of arms (18n) perpendicular to the filter layer (3).

5. Equipment according to claim 4, in which the said device (17) provided with outlet nozzles (18n) is supplied with means (19) which can make it rotate and/or move vertically with an alternating motion.

* * * * *